United States Patent [19]

Högner

[11] Patent Number: 5,113,906

[45] Date of Patent: May 19, 1992

[54] MULTIPLE ROTARY CONTROL VALVE FOR USE WITH A STERILIZING APPARATUS

[76] Inventor: Marcelo A. Högner, Austria 2353, Buenos Aires, Argentina

[21] Appl. No.: 576,845

[22] Filed: Sep. 4, 1990

[30] Foreign Application Priority Data

Sep. 7, 1989 [AR] Argentina .................. 314863

[51] Int. Cl.⁵ .................. F16K 11/00; F16K 7/06
[52] U.S. Cl. .................. 137/595; 137/624.18; 137/863; 251/4; 251/9
[58] Field of Search .................. 137/595, 624.18, 863; 251/4, 6, 9, 10

[56] References Cited

U.S. PATENT DOCUMENTS

| | | |
|---|---|---|
| 2,592,705 | 4/1952 | Jewell et al. . |
| 2,747,603 | 5/1956 | Klingler . |
| 3,018,793 | 1/1962 | Aagaard .................. 137/595 |
| 3,411,534 | 11/1968 | Rose .................. 251/9 X |
| 3,550,619 | 12/1970 | Halasz et al. .................. 137/595 |
| 3,861,421 | 1/1975 | Thompson . |
| 3,894,719 | 7/1975 | Horvath et al. . |
| 3,918,490 | 11/1975 | Goda . |
| 3,960,149 | 6/1976 | Bujan . |
| 4,172,619 | 10/1979 | Anderson et al. . |
| 4,194,535 | 3/1980 | Galland et al. . |
| 4,230,151 | 10/1980 | Jonsson .................. 137/595 |
| 4,282,902 | 8/1981 | Havnes . |
| 4,320,889 | 3/1982 | Genese . |
| 4,484,599 | 11/1984 | Hanover et al. .................. 251/4 X |
| 4,524,944 | 6/1985 | Sussman . |
| 4,537,221 | 8/1985 | Weirich et al. . |
| 4,694,861 | 9/1987 | Goodale et al. . |
| 4,781,898 | 11/1988 | Jones . |
| 4,786,028 | 11/1988 | Hammond . |
| 4,894,207 | 1/1990 | Archer et al. . |

FOREIGN PATENT DOCUMENTS

| | | | |
|---|---|---|---|
| 845292 | 7/1952 | Fed. Rep. of Germany .......... 251/4 |
| 2123118 | 1/1984 | United Kingdom .................. 251/4 |

*Primary Examiner*—Gerald A. Michalsky
*Attorney, Agent, or Firm*—Hoffman, Wasson & Gitler

[57] ABSTRACT

A multiple rotary control valve of the pinch type for use in conjunction with a steam sterilizing apparatus. The valve comprises at least two side by side cams, each having cylindrical and flat portions for respectively pressing and releasing, in the proper sequence, flexible tubes conducting the fluids intervening in the sterilizing process. In a preferred embodiment, the cams rotate about an axis transverse to the tubes and are disposed between opposite pairs of tubes, and the tubes are trained and held in transversely aligned openings provided in detachable covers. A wear member is provided between the cams and the respective tubes.

5 Claims, 3 Drawing Sheets

MULTIPLE ROTARY CONTROL VALVE FOR USE WITH A STERILIZING APPARATUS

BACKGROUND OF THE INVENTION

This invention refers to a multiple rotary control valve for controlling a sequence of steps requiring the intake and exhaust of different fluids in the same process. More particularly, the present invention refers to a multiple rotary valve of the "pinch" type for use in conjunction with a steam sterilizing unit in which the various fluids intervening in the sterilization process are channeled by flexible conduits made of elastic, collapsible material, and compressed or released in the proper sequence by a camming rotor.

Sterilizing units or autoclaves are complex apparatus, the operation of which require precise controls. Consequently, these apparatus are costly and not easily affordable by small biochemical laboratories or dental and medical offices.

The necessity to avoid infection risks to which doctors, nurses, technicians and patients are increasingly exposed, makes it desirable to have a sterilizing apparatus which is inexpensive, efficient and easy to operate. One of the problems of such apparatus is the exacting requirements of the sterilization cycle and the necessity of sequentially controlling a series of steps comprising the admission, heating and vaporization of water, purging of steam, venting of the sterilization chamber, intake and exhaust of cooling water, etc. This series of steps must be controlled by a multiple valve centralizing the command of all process steps. These valves are generally combined, multi-way valves, or tandem-connected valves with a single actuator.

The valves used in the control of sterilization equipment are precision devices which are costly to manufacture and difficult to connect to the fluid circuits of the equipment.

The main object of the present invention is to provide a multiple rotary valve of the "pinch" type for controlling the sequential admission and/or exhausting of the fluids intervening in a steam sterilization process, which valve is inexpensive and reliable, and which valve permits reducing significantly the cost of sterilization units, rendering them affordable to doctors' offices, laboratories and institutions which normally do not use these apparatus.

Another object of the invention is to provide a multiple pinch valve for controlling a sterilizing apparatus, which is easy to assemble and disassemble, and which permits the quick replacement of the flexible conduits.

A further object of the invention is to provide a pinch valve which could be used in conjunction with conduits of substantial diameter.

An additional object of the invention is to provide a sterilizing apparatus incorporating such valve, which is simple to operate by unskilled personnel.

While "pinch" valves for controlling the flow of fluids through flexible conduits are well known, they have not been used under severe or critical conditions or where reliability and precise operation are essential. This is basically due to the fact that flexible tubes, when subject continuously to abrasive contact with clamps, cams or other pinch devices, and to high pressures and temperatures, such as those typical in sterilizing processes, have a short life span and require frequent replacement.

Therefore, the use of "pinch" valves has been limited to light duty functions such as the control of flow in devices for the administration of therapeutical fluids, laboratory apparatus handling chemical reagents, or non-critical uses such as watering apparatus.

Examples of known pinch valves are U.S. Pat. No. 3,960,149 (Bujan) which discloses a parenteral administration unit, in which a flexible tube leading from a fluid container to a hypodermic needle is gradually pinched by a wedge-like rack meshing with a toothed rotor.

Another example is U.S. Pat. No. 3,918,490 (Goda) which discloses a fluid switching apparatus wherein two sets of flexible tubes are simultaneously pinched between an elongate cam and respective backing rods to inter-connect their outlet ends.

U.S. Pat. No. 4,786,028 (Hammond) discloses a control valve comprising a rotatable cam which acts on a tube-pinching piston. A similar arrangement is shown in U.S. Pat. No. 4,694,861 (Goodale et al).

U.S. Pat. No. 4,524,944 (Sussman) discloses a plant watering device in which a rotary cam compresses, or releases, a flexible tube leading from a source of water to a dispensing nozzle. The angular position of the cam is adjusted by a rotatable knob.

U.S. Pat. No. 4,282,902 (Haynes) discloses a valve apparatus for laboratory use comprising a plurality of rotatable cams mounted on a common shaft. Each cam sequentially engages a pair of opposite levers which, in turn, pinch or release, as necessary, respective flexible tubes against backing rods.

The valves of Bujan, Goda, Sussman, are obviously unsuitable for use in conjunction with a sterilizing apparatus. Goodale's valve is very complex and expensive to manufacture. In Haynes' valve the force of the cam acts on an intermediate portion of each pinching lever, and consequently, the pinching force applied by the end of the lever on the respective tube is only a fraction of the cam force. Such force could only pinch a tube of very small diameter, such as the $\frac{1}{8}''$ tube mentioned in Haynes' specification. Besides, the diameter of the backing rod is similar to that of the tube, and this might result in a stress concentration which might cause the early failure of the tube if used in the temperature and pressure conditions prevailing in steam sterilization processes. Finally, in the Haynes valve, the flexible tubes are not positively located relative to the pinching levers, and the tubes could be easily dislodged rendering the levers inoperative.

SUMMARY OF THE INVENTION

The multiple valve of the invention comprises a frame having a flat backing portion, a shaft rotatably mounted on said frame, a rotor fixedly mounted on said shaft and arranged to rotate therewith in close proximity to a plurality of conduits made of flexible and elastic material removably attached to said frame and backed by said flat portion, said conduits channelling the fluids controlled by the valve; said rotor defining transversal cam arranged to control at least one conduit; each cam zone having a first portion adapted to press and close a conduit against said frame, and a second portion whose radial distance to the rotation axis is less than said first portion and adapted to release said conduit; the first and second portions of each transversal cam zone being angularly offset, or in phase, relative to the sectors of other cam zones depending on the opening and closing sequence required for the respective conduits, and a flexible wear strip between each conduit and the respective cam zone whereby each conduit is pressed by the respective cam zone against the backing portion of the frame.

In a preferred embodiment, the valve of the invention comprises a housing having front, rear and side walls, and top and bottom covers, a shaft journaled in said front and rear walls; at least two cams fixedly mounted, side by side on said shaft, each of said cams having a flat chordal portion and a cylindrical portion; the flat chordal portions of said cams being angularly offset; said top and bottom covers having openings aligned in a transverse direction relative to said shaft, at least two substantially parallel flexible tubes trained in the openings of the top cover, and at least two substantially parallel flexible tubes trained in the openings of the bottom cover, whereby each cam is disposed between and adjacent to a pair of opposite tubes; flexible wear strips attached to one of the side walls and interposed between the cams and their adjacent tubes, means for attaching said top and bottom covers to each other, whereby rotation of the cams will sequentially compress and release the adjacent tubes to control the flow of fluid therethrough. The two cams could form a single cam member.

The invention also provides a sterilizing apparatus comprising such valve.

BRIEF DESCRIPTION OF THE DRAWINGS

With reference to FIG. 1, a simplified embodiment of the multiple control valve of the invention is shown rather schematically therein. The valve, generally identified with reference numeral 1, comprises a frame 2, preferably made of bent sheet metal, and having two spaced-apart vertical walls, 3 and 3', which rotatably support a substantially horizontal shaft 4, and two shorter, lateral walls 5 and 5' having aligned openings through which respective conduits 6, 7, 8, 9, and 10 pass.

Figure 1:
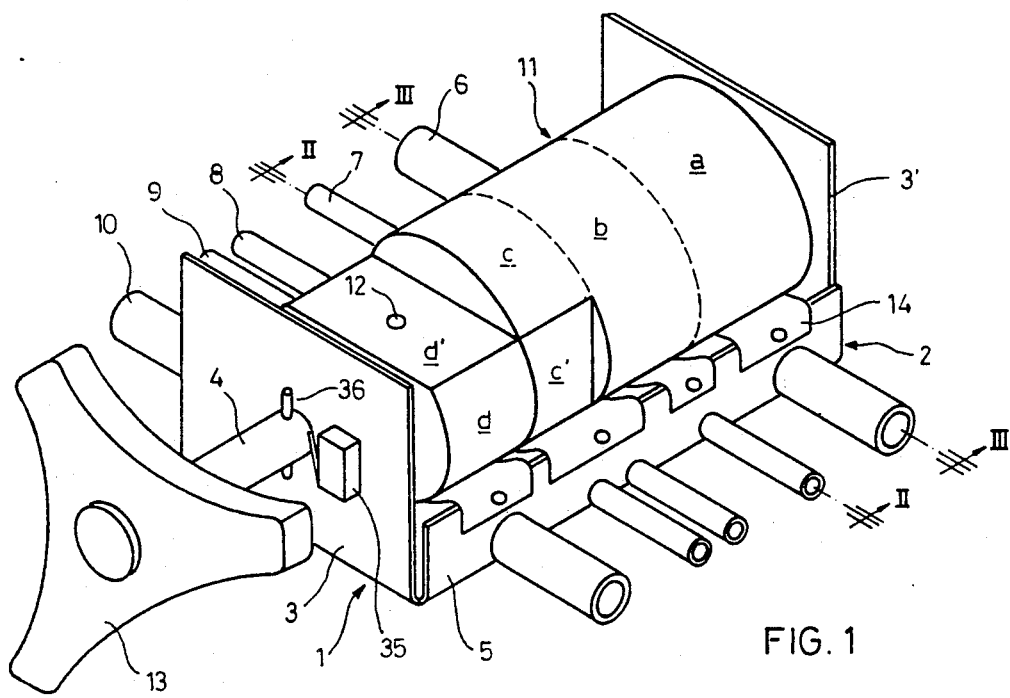
FIG. 1 is a perspective view of a simplified embodiment of the multiple valve of the invention.

Conduits 6–10 are made of flexible, elastic material, for instance, an elastomeric material such as silicone rubber, the cross sectional areas of which are dimensioned in accordance with the flow rate of the fluids passing therethrough.

The conduits are frictionally retained in the openings provided in the lateral walls 5 and 5'. A rotor 11 is mounted on shaft 4, between vertical walls 3, 3'. Rotor 11 is fixed to the shaft by a set screw (such as screw 12), a key or any other appropriate means.

An end of shaft 4 extends beyond the front wall 3 of the frame and is fixed to a knob or wheel 12 for the manual operation of the valve.

For the purposes of the present description, rotor 11 may be considered as comprising a plurality of adjacent cam zones or slices (indicated by dotted lines), each having a cylindrical portion a, b, c, d and a planar, chordal portion a', b', c', d' (of which only portions c' and d' are visible in FIG. 1).

Each transversal rotor zone 11 is arranged to control one of conduits 6–10 although in the embodiment of FIG. 1, the zone including rotor portions c and c' simultaneously controls adjacent conduits 8 and 9.

The cylindrical portions of rotor 11 are arranged to compress and close the respective conduits against a flat backing portion of frame 2 (see FIG. 2), whereas the planar portions of the rotor define chords whose respective distances to the periphery of the rotor are slightly larger than the outer diameters of the respective conduits. Thus, when the planar portions sequentially face the respective conduits, these are released permitting the unrestricted flow of fluid. Between the transversal rotor zones and the respective conduits, respective flexible strips 14 are arranged. These strips 14, which are made of brass or the like, are attached at one end to lateral wall 5 by means of a rivet or the like to prevent abrasion of the conduits by the cylindrical portions of the rotor.

It may be seen in FIG. 1 that the compression and release (i.e. the cylindrical and planar) portions of each rotor zone 11 are angularly offset, or staggered, relative to the compression and release portions of other rotor zones, according to the programmed opening and closure sequence required by the process to be controlled.

Although the rotor has been shown as an integral unit, it could be assembled of independent side-by-side disc members, each of which is fixed to shaft 4.

Rotor 12 may be a moulded or machined member of plastic material.

Upon rotating shaft 4 by means of the wheel or knob 13, conduits 6–10 will be throttled or released in the required sequence, which is dictated by the angular offset of the cylindrical and planar portions of the transversal rotor zones 11.

Attached to the front wall 3 of the valve, there is a microswitch 35 which is actuated by a lug or cam 36 provided in the rear portion of shaft 4. This microswitch is inserted in an electrical circuit energizing the heating resistors of an autoclave as it will be explained below.

Rotor 11 could also be driven by a stepping motor, a ratchet arrangement, or any other mechanical or magnetic mechanism.

Figure 2:
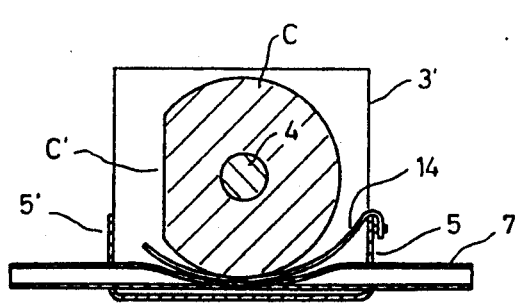
FIG. 2 is a section along line A—A of FIG. 1 showing a compressed conduit in which the fluid flow has been interrupted.
Figure 3:
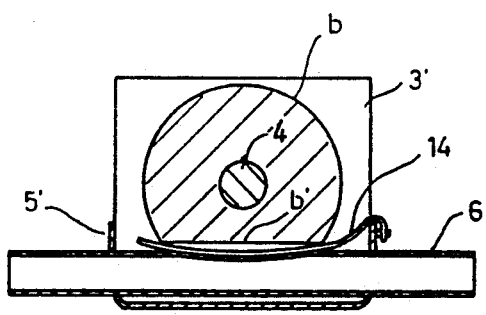
FIG. 3 is a section along line B—B' of FIG. 1 showing a released conduit through which the fluid may flow freely.
Figure 4:
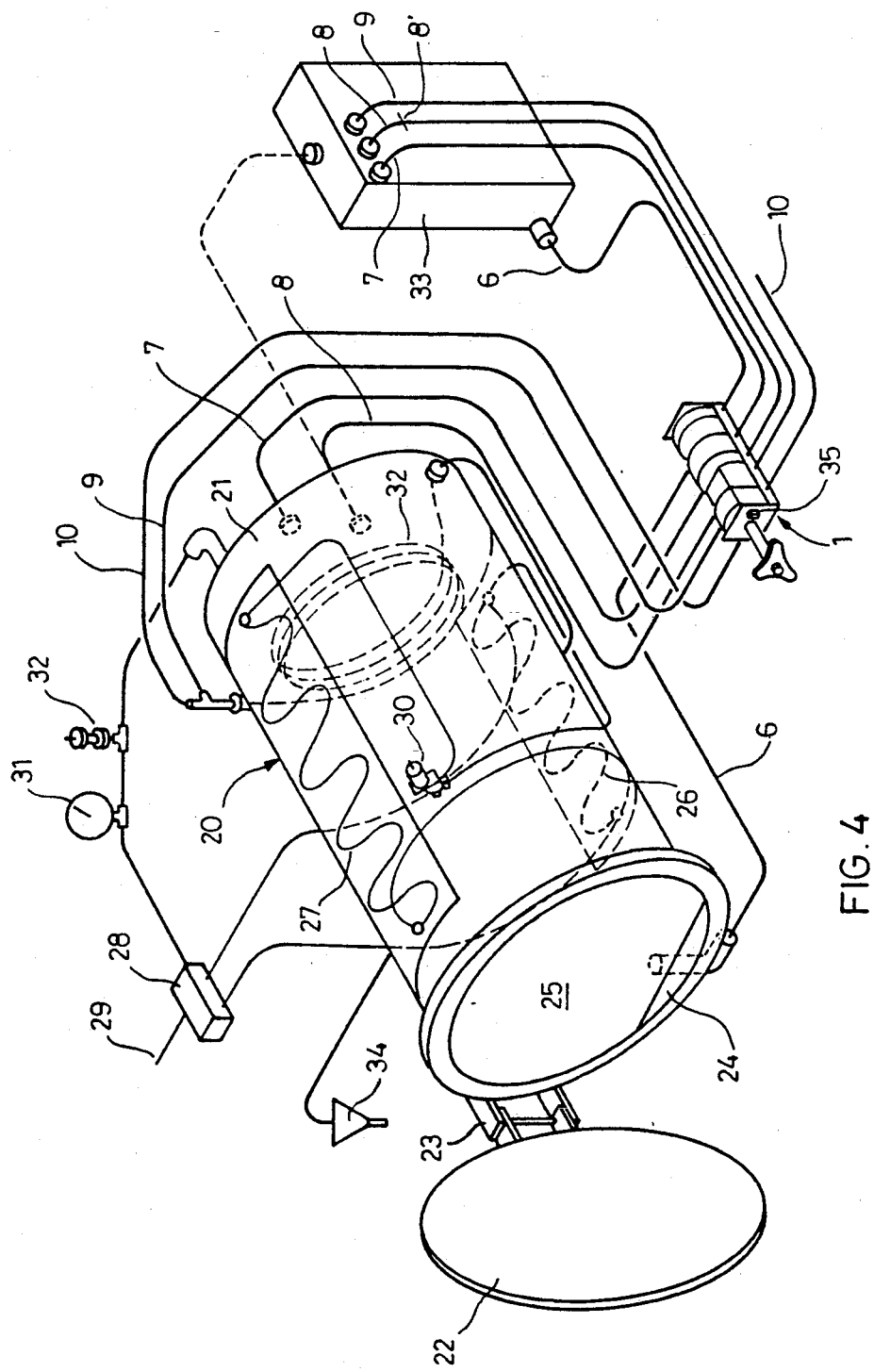
FIG. 4 shows schematically an autoclave with its water, air and steam circuits controlled by a valve according to the invention.

FIG. 4 shows schematically a steam sterilizing apparatus or autoclave 20 controlled by the multiple valve of FIGS. 1–3.

The autoclave 20 comprises a container 21 having a hermetically sealable door 22, capable of resisting both pressure and vacuum, hinged to the container at 23. The closure means for the door have not been shown because they are not part of the present invention.

Container 21, which has been shown as cylindrical in shape, has at the bottom of its front opening, a small dike or barrier 24 which establishes the water level inside inner chamber 25.

An electrical heating resistor 26 is arranged in the bottom part of the container 21 for evaporating the water contained in chamber 25, and an electrical heating resistor 27 is arranged at the top of the container for heating the chamber walls.

Both resistors are electrically connected to a control box 28 which in turn is connected to an electrical power supply 29. The control box 28 is provided with an internal pressurestat which connects or, disconnects, resistor 26 for evaporating water inside the chamber while maintaining the programmed pressure values. The control box is also connected to a thermostat 30 which controls the temperature of the chamber walls and which connects or disconnects resistor 27 to maintain the programmed temperature values. Resistors 26 and 27 are independent and respond to the pressure inside the chamber and to the temperature of the chamber walls, respectively.

Thus, the resistors remain connected to the electrical supply until the specified pressure and temperature are reached.

A mano-vacuuometer 31 measures the pressure in the chamber 25, and a safety valve 32 releases steam when the specified maximum pressure is exceeded.

Inside the autoclave, there is a cooling serpentine conduit 32 having a drain 34.

A reservoir 33 holds distilled water for charging the autoclave.

The multiple valve of the invention controls conduits 6–10 which, in the embodiment shown, have the following functions:
- 6: conduit for charging distilled water, connected to the bottom of reservoir 33 and leading to the inside of the autoclave;
- 7: conduit for venting the autoclave chamber;
- 8: conduit for purging air from the autoclave chamber;
- 9: venting conduit for draining the cooling serpentine 32;
- 10: conduit for the admission of water to the cooling serpentine 32.

Conduits 6–9 are connected to the top portion of reservoir 33, above the distilled water level, and conduit 11 is connected to a cold water line.

As mentioned above, microswitch 35 connects or disconnects resistors 26 and 27 at the appropriate time in the cycle.

The operation of the valve 1 in the control of a typical steam sterilization cycle will now be explained:

We shall consider that the autoclave is empty, with the door open and with the control valve in the final step of the preceeding cycle, that is, with all conduits closed, except conduit 7 which equalizes the pressure in the autoclave chamber with the atmospheric pressure. Obviously, reservoir 33 will contain distilled water, the electrical-power supply will be connected to control box 28, conduit 10 will be connected to a source of cold water, and the serpentine drain conduit will be connected to drain 34.

Step 1 (charging of water): Distilled water is charged to the sterilizing unit, for which purpose, the control valve will be rotated to a first position in which conduit 6 is open. Water is admitted until it reaches the required level, which is established by dike or barrier 24, and may be visually determined.

Step 2 (Sterilization): Once the required water level is reached, the control valve is passed to the second position in which all conduits are closed, except conduit 9 which permits air to enter the serpentine to empty it in drain 34, and conduit 8 which permits the continuous purge of air contained in the chamber, scavenging it with steam. The material to be sterilized is placed into the chamber and the door is closed. In this step, the angular position of shaft 4 actuates microswitch 35 by means of lug 36 and resistors 26 and 27 are connected. With the bottom resistor 26, the water in the chamber is heated, and when vaporized, it generates the required pressure. This pressure is maintained within the specified values by switching the presostat contained in box 28. With top resistor 27, the chamber walls are heated and the walls temperature is maintained substantially at the specified values by switching the thermostat 30. For example, during the required sterilization time, the pressure is maintained at 1 kg/cm$^2$ and the temperature at 121° C. Once the sterilization time is over, for example, after 25 minutes, the control valve is passed to the next step turning knob 13.

Step 3 (vacuum drying): In this step, the electrical power supply to resistors 26 and 27 is cut-off upon disconnection of microswitch 35. Conduit 10 is opened, cold water enters the cooling serpentine 32 and after circulating therethrough, it exits to drain 34. All the other conduits are closed. Serpentine 32 first condenses the steam in chamber 25 creating a vacuum and then cools the unit in, for example, about 11 minutes. After the drying time is over, the control valve is turned to step 4.

Step 4 (venting): Conduit 7 is opened and the chamber is vented. The pressure in chamber 25 is equalized by the admission of air.

Step 5 (unloading of sterilized products): The door is opened and the equipment is unloaded. All conduits are closed except venting conduit 7.

The front wall 3 of the control valve may include a dial or indicia to indicate the step presently in progress and also indicating the recommended time-periods for each step.

Conduit 8, for purging air from the autoclave, instead of being controlled by the rotary valve, could be connected directly to the reservoir 33 and controlled by a check valve (shown in dotted lines in FIG. 4). Thus, while air is being purged, the check valve remains open, but when vacuum is produced upon condensation of steam by the cooling serpentine, the check-valve closes. This arrangement is preferred because once air is eliminated from the autoclave chamber, steam exits through the purging conduit 8 eventually causing this conduit to fail in the pinching area. Besides, this arrangement permits controlling four conduits instead of five thus simplyfing the rotary control valve.

It can be seen that only one conduit is open in each of the process steps of the sterilizing cycle:

Step 1 (water intake):
  Conduits 7, 9, 10: closed
  Conduit 6: open
Step 2 (sterilization):
  Conduits 6, 10, 7: closed
  Conduit 9: open
Step 3 (drying):
  Conduits 6, 7, 9: closed
  Conduit 10: open
Step 4 (venting) and Step 5 (unloading):
  Conduits 6, 10, 9: closed
  Conduit 7: open This observation led to the design of the preferred embodiment of the invention wherein the flexible conduits or tubes have been rearranged so that each cam controls two opposite conduits and only two cams are required. This result in a more compact and less expensive design.

Figure 5:
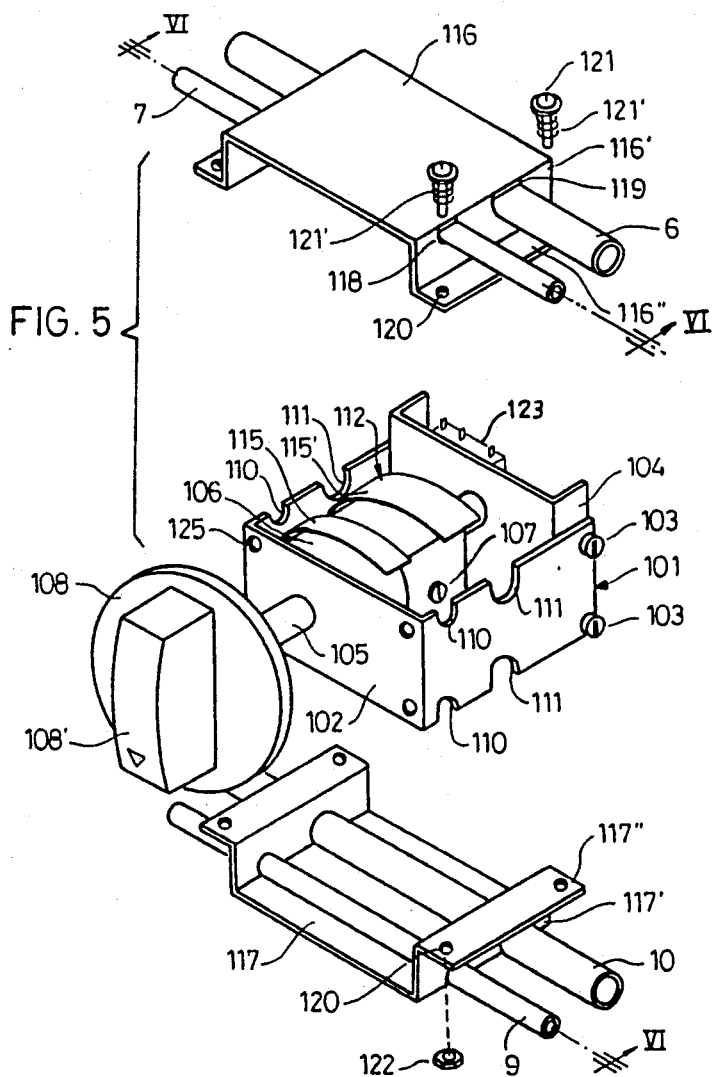
FIG. 5 is a perspective view of a preferred embodiment of the multiple valve of the invention, with the top and bottom covers removed.

With reference to FIG. 5, the preferred embodiment of the invention comprises a housing 101, comprising a "U" shaped member 102, attached by screws 103 to a "C" shaped member 104, both made of bent sheet metal. Members 102 and 104 define the front, rear and side walls of an open top and open bottom structure.

A shaft 105 is journaled in the front and rear walls of the housing, and two side-by-side cams 106, which could be an unitary cam member, are fixedly attached to the shaft for rotation therewith by a set screw 107. The shaft extends beyond the front and rear walls. An operating knob 108 having a indexing member, such as bar 108' is fixedly attached to the front end of the shaft.

A lug or pin 109 projects radially from the rear portion of the shaft for purposes later explained.

The upper and lower edges of the side walls have aligned notches 110, 111 to accomodate flexible conduits 6, 7, 9, 10 which extend transversely to the shaft 105.

Figure 8:
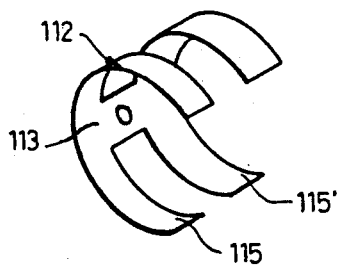
FIG. 8 is a perspective view of the flexible wear member.

A curved, H-shaped wear member, 112 made of flexible sheet metal (shown in detail in FIG. 8) is attached by its central portion 113 to one of the side walls of the housing by a rivet 114 or the like. The legs 115, 115' of the wear member 112 encircle the cams 106 and are disposed between them and the respective conduits.

The housing 101 is closed by top and bottom covers, 116, 117 also made of stamped sheet metal. The top and bottom covers are identical and interchangeable and have side walls 116', 117' with transversally aligned openings 118, 119 in which the conduits are trained and retained frictionally.

The side walls 116', 117' of the top and bottom curves extend into flanges 116", 117" having vertically aligned holes, 120, which serve to attach the covers one to another by means of screws 121 and nuts 122.

Coiled springs 121' disposed around each screw 121 are compressed between the screw heads (or respective washers) and the flanges 116" of the top cover. Thus, the flexible conduits press elastically against the cams. This construction permits compensating for manufacturing tolerances and prolong the lives of the conduits.

Figure 7:
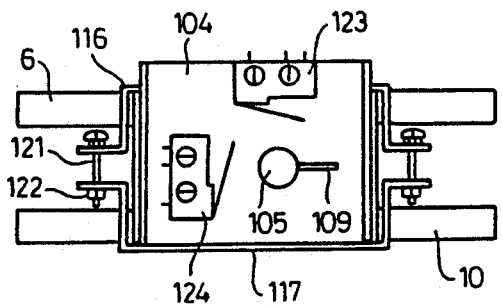
FIG. 7 is a rear view of the valve of FIG. 5.

With reference to FIG. 7, which is a rear view of the valve housing, micro-switches 123, 124 are attached to the rear wall, and the operating levers of the switches are disposed in the path of the lug 109 attached to the rear portion of shaft 105.

The top switch 123 enables operation of the sterilizing unit only when the shaft and the cams attached thereto are in a given angular position corresponding to step 1. The other switch 124 activates the heating resistors of the autoclave.

Figure 6:
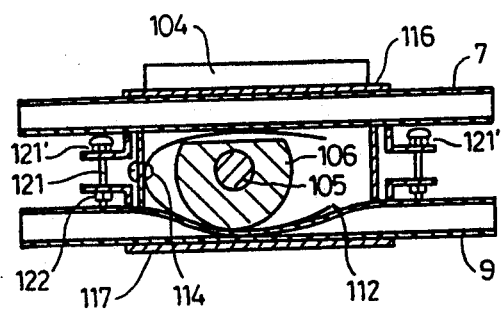
FIG. 6 is a section along line VI—VI of FIG. 5, showing one tube released and an opposite tube pinched.

It can be seen from FIGS. 2 and 6 that the wear strip 14 or the wear member 112 compresses the conduit(s) against a flat surface. Consequently, the force applied by the cam is distributed over a relatively large area thus decreasing the stress concentration and extending the useful lives of the conduits.

The embodiment of FIGS. 5-7 permits the quick replacement and/or inspection of the flexible conduits by simply removing the screws interconnecting the top and bottom covers 116, 117.

The outside diameter of conduits 6 and 10 (which conduct water) is about 8 mm (5/16") and the outside diameter of conduits 7 and 9 (which conduct steam or air) is about 5 mm (⅛").

The flat or chordal portions of cams 106 are angularly offset 90°.

The front wall of the housing has tapped holes 125 for attaching the valve to a front panel (not shown) of the sterilizing apparatus.

I claim:

1. A multiple rotary control valve for use in conjunction with a steam sterilizing apparatus comprising a container having a hermetically sealable door, heating means, a steam generating water circuit, a cooling water circuit, a venting circuit and a purging circuit, said circuits comprising conduits made of flexible and elastic material controlled by said valve, said valve comprising a housing having front, rear and side walls, and top and bottom covers, a shaft journaled in said front and rear walls; at least two cams fixedly mounted, side by side on said shaft, each of said cams having a flat chordal portion and a cylindrical portion; the flat chordal portions of said cams being angularly offset; said top and bottom covers having openings aligned in a transverse direction relative to said shaft; at least two substantially parallel flexible conduits trained in the openings of the top cover, and at least two substantially parallel flexible conduits trained in the openings of the bottom cover, whereby each cam is disposed between and adjacent to a pair of opposite conduits; the top and bottom edges of said side walls having notches aligned with the openings of said covers for accommodating said conduits, a flexible wear member attached to one of the side walls and comprising at least two individual, curved, flexible strips, each overlying and partly encircling each cam and disposed between the cam and the respective conduits; means for removably and resiliently attaching said top and bottom covers to each other, whereby rotation of the cams will sequentially compress the adjacent conduits against the respective covers to control the flow of fluid therethrough.

2. A control valve as claimed in claim 1, wherein said wear member is H-shaped and is attached by its central portion to one of said side walls, said curved, flexible strips forming the legs of said member.

3. A control valve as claimed in claim 1, wherein said eovers are identical and interchangeable and comprise flanges with vertically aligned holes, which, when the covers are in position, project from said front and rear walls, said covers being attached to each other by means of screws and nuts, and pressing resiliently against the conduits.

4. A control valve as claimed in claim 3, wherein coiled springs are arranged about said screws, and compressed between said screws and nuts against the flange of one cover.

5. A valve as claimed in claim 1, wherein said two cams form a single cam member.

* * * * *